US006344273B1

(12) United States Patent
Satsu et al.

(10) Patent No.: US 6,344,273 B1
(45) Date of Patent: Feb. 5, 2002

(54) TREATMENT SOLUTION FOR FORMING INSULATING LAYERS ON MAGNETIC PARTICLES PROCESS FOR FORMING THE INSULATING LAYERS, AND ELECTRIC DEVICE WITH A SOFT MAGNETIC POWDER COMPOSITE CORE

(75) Inventors: Yuichi Satsu; Hideaki Katayama, both of Hitachi; Yuzo Ito, Mito; Akio Takahashi; Noboru Baba, both of Hitachiota; Chikara Tanaka, Hitachi; Kazuo Asaka; Chio Ishihara, both of Matsudo; Hiroaki Miyata; Kazuhiro Satou, both of Hitachi, all of (JP)

(73) Assignees: Hitachi, Ltd., Tokyo; Hitachi Powdered Metals Co., Ltd., Chiba-ken, both of (JP)

( * ) Notice: Subject to any disclaimer, the term of this patent is extended or adjusted under 35 U.S.C. 154(b) by 0 days.

(21) Appl. No.: 09/448,475

(22) Filed: Nov. 24, 1999

Related U.S. Application Data

(62) Division of application No. 08/863,627, filed on May 27, 1997, now Pat. No. 6,054,219.

(30) Foreign Application Priority Data

May 28, 1996 (JP) ............................................ 8-133239
Sep. 30, 1996 (JP) ............................................ 8-258726

(51) Int. Cl.[7] ............................ B05D 7/00; B05D 3/02; B32B 5/16
(52) U.S. Cl. ........................ 428/403; 427/220; 427/384
(58) Field of Search .......................... 428/403; 427/220, 427/384

(56) References Cited

U.S. PATENT DOCUMENTS

| | | | | | |
|---|---|---|---|---|---|
| 4,100,089 | A | * | 7/1978 | Cammack, II et al. | 252/63 |
| 4,223,071 | A | * | 9/1980 | Boyer et al. | 428/411 |
| 4,675,356 | A | * | 6/1987 | Miyata | 524/424 |
| 4,818,614 | A | * | 4/1989 | Fukui et al. | 428/403 |
| 5,314,633 | A | * | 5/1994 | Ryer et al. | 252/46.7 |
| 6,054,219 | A | * | 4/2000 | Satsu et al. | 428/403 |

FOREIGN PATENT DOCUMENTS

| | | |
|---|---|---|
| JP | 63-70504 | 3/1988 |
| JP | 1-220407 | 9/1989 |

OTHER PUBLICATIONS

Hopken, et al, "Synthesis and mesoscopic organization of perfluoroalkyl–alkylene methacrylate monomers" *Mol. Cryst. Liq. Cryst.*, UK, Jan. 1992 (abstract only).

* cited by examiner

*Primary Examiner*—Hoa T. Le
(74) *Attorney, Agent, or Firm*—Mattingly, Stanger & Malur, P.C.

(57) ABSTRACT

The present invention provides a soft magnetic powder composite core for an electric apparatus produced with soft magnetic particles having electric insulating layers on the surfaces thereof, wherein said electric insulating layers are formed by mixing said soft magnetic particles with an insulating layer-forming solution which comprises a phosphating solution and a rust inhibitor, which is an organic compound containing at least one of nitrogen or sulfur having a lone pair of electrons suppressing the formation of iron oxide and surfactant, and drying the treated soft magnetic particles at a predetermined temperature. The soft magnetic powder composite core is excellent in iron loss and magnetic flux density.

28 Claims, 3 Drawing Sheets

(THE SAME IRON PARTICLE)

1···PRESSED POWDER MAGNETIC CORE
2···COIL

3···THYRISTOR 4···VOLTAGE DIVIDER RESISTANCE
5···SUNBBER RESISTANCE 6···SUNBBER CAPACITOR

TREATMENT SOLUTION FOR FORMING INSULATING LAYERS ON MAGNETIC PARTICLES PROCESS FOR FORMING THE INSULATING LAYERS, AND ELECTRIC DEVICE WITH A SOFT MAGNETIC POWDER COMPOSITE CORE

This is a divisional application of U.S. Ser. No. 08/863,627, filed May 27, 1997 now U.S. Pat. No. 6,054,219.

BACKGROUND OF THE INVENTION

The present invention relates to a soft magnetic powder composite core, especially a high frequency soft magnetic powder composite core for use in high frequency transformers, reactors, thyristor valves, noise filters, choke coils and the like, a process for forming insulating layers on the soft magnetic particles suitable for the core, a treatment solution for forming the insulating layers, and an electric device with the soft magnetic powder composite core.

The cores for high frequency coils which are used for high frequency transformers, reactors, thyristor valves, noise filters, choke coils and the like should not only have a low iron loss and a high magnetic flux density, but also have magnetic properties which do not get worse even in high frequency regions.

The iron loss includes an eddy current loss which has a close relation with a resistivity of core and a hysteresis loss which is greatly influenced by strains in iron particles caused in the process of production of the iron particles and post-processing history thereof.

The eddy current loss increases in direct proportion to the square frequency, so it is important to lower the eddy current loss in order to improve the properties at high frequencies. Lowering the eddy current loss requires molding of soft magnetic particles under compression into a core and to have the soft magnetic powder composite cores structured with each soft magnetic particle being insulated so that eddy currents are confined in small domains.

However, if the insulation is not sufficient, the eddy current loss becomes large. It may be considered to thicken the insulating layers to improve the insulating property. However, a thicken insulating layer results in a lower magnetic flux density due to a reduction in the proportion of soft magnetic particles in a core. Alternatively, an attempt to increase the magnetic flux density by compression-molding under high pressures may lead to larger strains in the shape, hence to a higher hysteresis loss resulting in an increase in iron loss.

In order to manufacture a soft magnetic powder composite core having better characteristics, therefore, it is important that the resistivity of the core is increased without reducing the density. For this reason, it is necessary to cover iron particles with a thin insulating layer having a high insulating property.

The soft magnetic powder composite cores have heretofore been produced by processes where the insulating layers are made or organic binders such as fluorinated resins or inorganic binders such as polysiloxanes and water glass as disclosed in Japanese Patent KOKAI (Laid-open) Nos. Sho 59-50138, 61-154014 and 51-89198. In order to obtain sufficient insulating properties by these processes, however, it is necessary to increase the thickness of the insulating layers which results in reduced magnetic permeability.

An attempt has been proposed to solve the above problems by subjecting soft magnetic particles to a coupling treatment and then mixing with binder resin, followed by molding under pressure as disclosed in Japanese Patent Publication No. Hei 6-11008. However, in this process the resistivity cannot be sufficiently increased though the higher density may be achieved.

In order to overcome the difficulties as above, there has been proposed a process for forming thin insulating layers on magnetic particles without lowering the density where the layers having excellent properties can be formed by treatment of a phosphate salts solution. This phosphat treatment is disclosed in Japanese Patent KOKAI (Laid-open) Nos. Hei 6-260319, Sho 62-22410, and Sho 63-70504.

It has been found, however, that even using any of these processes, it is difficult to sufficiently increase the resistivity of the magnetic core without lowering the density.

In the prior art, there has been no treatment solution for forming insulating layers which allows formation of thin layers having good insulating properties on iron particles, nor a process for producing soft magnetic particles which have thin and highly insulating layers coated on the surfaces and a high formability under compression. Therefore, it has been difficult heretofore to produce a soft magnetic powder composite core having a sufficiently low iron loss and a sufficiently high magnetic permeability.

An investigation has been made to find out the causes of the insufficient resistivity and magnetic permeability of prior art soft magnetic powder composite cores which were made with soft magnetic particles having insulating layers formed by using conventional insulating layer-forming phosphate solutions. As a result, the following have been found:

When iron particles are treated to form insulating layers thereon, rust is produced on the iron particles. The rust may cause a reduction in formability under compression which leads to an insufficiently high magnetic flux density. Depending upon the heat-treatment conditions, there may be produced a sort of iron oxide (rust), i.e., electro-conductive $Fe_3O_4$ which causes a reduction in electric resistance as well as an increase in eddy current loss of a magnetic core which is produced by pressing the particles.

Taking account of the foregoing, it has been found that the generation of rust at the time of treating the soft magnetic particles for forming insulating layers thereon must be prevented in order to obtain a soft magnetic powder composite core having excellent characteristics.

On the other hand, Japanese Patent KOKAI No. Hei 1-220407 discloses a soft magnetic powder composite core which was produced by treating soft magnetic particles with a rust inhibitor such as benzotriazole and then mixing them with a binder resin and molding the mixture under pressure into a magnetic core. This method effects suppression of the generation of rust by oxygen or water present in the air after the product on of the soft magnetic powder composite core. However, this method cannot solve the aforementioned problems that the resistivity of soft magnetic particles is raised and the iron loss is reduced.

If a phosphating treatment is performed after the rust inhibiting treatment to expect realization of both rust inhibition and insulating effects, the formation of insulating coatings does not proceed uniformly, resulting in a reduced resistance which causes a high eddy current loss, though the generation of rust may be suppressed.

Since the solutions for the phosphating treatment are an acidic aqueous solution containing a high concentration of ions and the treatment is performed at high temperatures, a corrosion current is generated at the time of formation of the insulating layers so that the generation of rust occurs on the surfaces of iron particles to render the formation of insulating layers uneven From the foregoing, it has been concluded that there is a need for a solution for phosphating treatment which has an intense electronic interaction with the surfaces of iron particles and an effect of preventing the generation of rust due to the suppression of the generation of corrosion current, and which does not adversely affect the formation of insulating layers. The present invention has been achieved based on this conclusion.

SUMMARY OF THE INVENTION

An object of the present invention is to provide a solution for treatment of soft magnetic particles to be used for a soft magnetic powder composite core so as to form insulating layers uniformly on the surfaces of the particles while suppressing the generation of rust on the surfaces of the soft magnetic particles, a process for the surface treatment, a soft magnetic powder composite core made with the resulting soft magnetic particles and an electric apparatus with said magnetic core.

Another object of the present invention is to provide a solution for treating soft magnetic particles to be used for a soft magnetic powder composite core to form insulating layers on the surfaces of the particles, where said solution comprises a phosphating solution and a rust inhibitor, said rust inhibitor being an organic compound containing at least one of nitrogen or sulfur which has a lone pair electrons suppressing the formation of iron oxide.

Still another object of the present invention is to provide a process for forming electric insulating layers on the surfaces or soft magnetic particles to be used for a soft magnetic powder composite core, where a solution for treating said soft magnetic particles to form said insulating layers comprises a phosphating solution and a rust inhibitor, said rust inhibitor is selected from organic compounds containing at least one of nitrogen or sulfur which has, lone pair electrons suppressing the formation of iron oxide, and said soft magnetic particles is mixed with said insulating layer-forming treatment solution and dried at a predetermined temperature to form said insulating layers.

Still another object of the present invention is to provide a soft magnetic powder composite core for an electric apparatus produced with soft magnetic particles having an electric insulating layer on the surface, where said electric insulating layer is formed by mixing said soft magnetic particles with a solution comprising a phosphating solution and a rust inhibitor, said rust inhibitor being selected from organic compounds containing at least one of nitrogen or sulfur which has a lone pair electrons suppressing the formation of iron oxide, and by drying the particles at a predetermined temperature.

Still another object of the present invention is to provide an electric apparatus where said soft magnetic powder composite core is used in a part of an electric circuit.

The organic compounds include those which have a molecular orbital which is as wide as the electron orbital of the iron surface and which has an orbital energy close to the orbital energy of the iron surface.

These organic molecules may be adsorbed on the surfaces of soft magnetic particles and suppress the formation of iron oxide thereon, which adsorption does not inhibit the formation of insulating layers because of microscopic adsorption on the molecular order.

That is, the treatment of soft magnetic particles with an insulating layer-forming solution comprising a phosphating solution and an appropriate amount of the aforementioned rust inhibitor added thereto allows the inhibition of rust generation and the formation of uniform insulating layers which have a high insulating property. As a result, a soft magnetic powder composite core having a high resistivity can be easily obtained.

Figure 1:
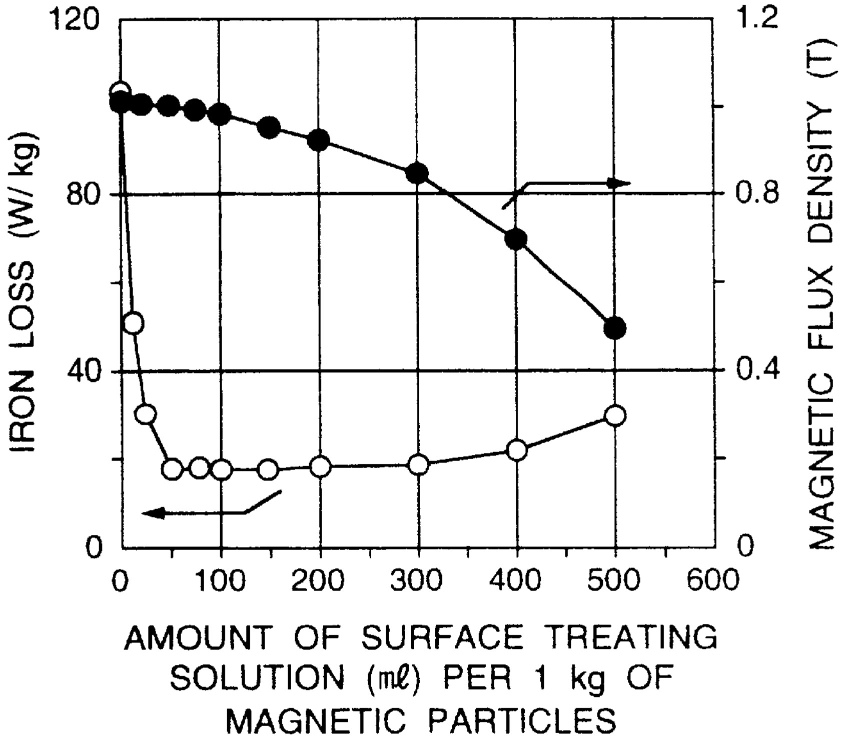
FIG. 1 shows graphically the relationship between the amount of an insulating layer-forming solution to be used per one kg of soft magnetic particles, and the iron loss and the magnetic flux density of a specimen which was formed under pressure.

Designation of Reference Numbers:

1 Soft magnetic powder composite core

2 Coil

3 Thyristor

4 Voltage divider resistance

5 Snubber resistance

6 Snubber capacitor.

DETAILED DESCRIPTION OF THE INVENTION

The solutions for the insulating layer-forming treatment as described above include phosphating solutions and the organic binders include epoxy and imide families, without being limited thereto.

The rust inhibitors include compounds containing nitrogen or sulfur which have a lone pair electrons as represented by the formulas (2) to (50):

(2)

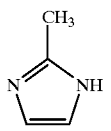

(3)

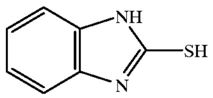

(4)

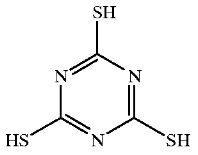

-continued
(5)
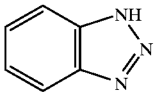
(6)
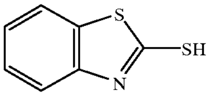
(7)
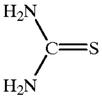
(8)
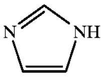
(9)
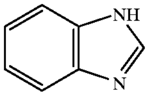
(10)
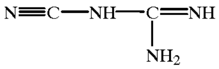
(11)
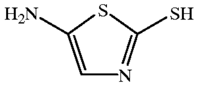
(12)
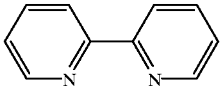
(13)
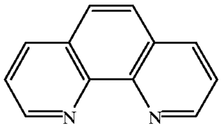
(14)
$H_3C-[CH_2]_n-NH_2$ where n = 3~20
(15)
$CH_3-[CH_2]_n-NH-[CH_2]_m-CH_3$ where n = 1~15
m = 1~15
(16)
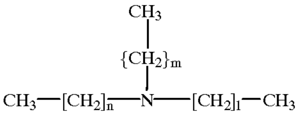
where n = 1~10
m = 1~10
l = 1~10
(17)
$HO-[CH_2]_n-NH_2$ where n = 2~20
(18)
$HO-[CH_2]_n-NH-[CH_2]_m-OH$ where n = 1~15
m = 1~15
-continued
(19)
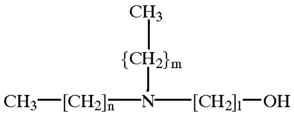
where n = 1~10
m = 1~10
l = 1~10
(20)
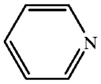
(21)
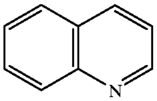
(22)
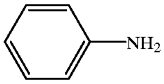
(23)
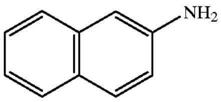
(24)
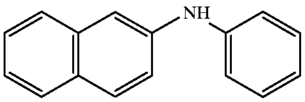
(25)
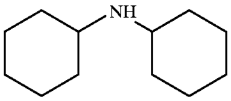
(26)
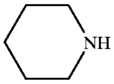
(27)
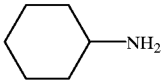
(28)
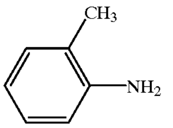
(29)
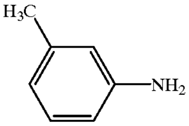
(30)
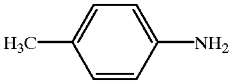

-continued (31)

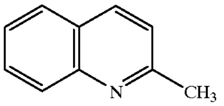

(32)

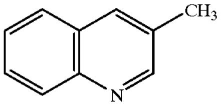

(33)

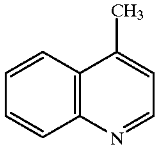

(34)

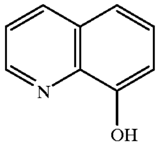

(35)

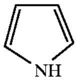

(36)

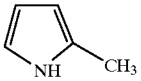

(37)

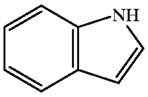

(38)

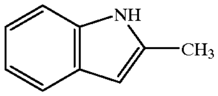

(39)

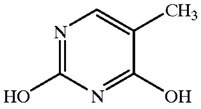

(40)

$H_2N—[CH_2]_2—NH_2$ (41)

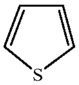

(42)

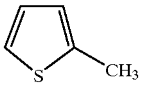

(43)

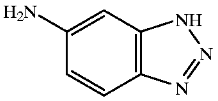

-continued (44)

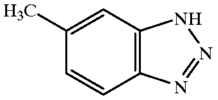

(45)

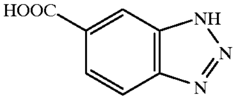

(46)

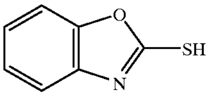

(47)

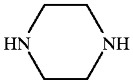

(48)

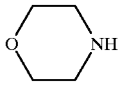

(49)

$HO—[CH_2]_2—NH_2$ (50)

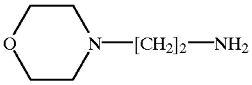

The solutions for treating soft magnetic particles to form the insulating layers on the surfaces thereof may be used by adding an amount of the solution to the soft magnetic particles, mixing, and subjecting a heat-treatment so as to suppress the generation of rust and form uniform thin insulating layers on the surfaces of the particles. Solvents for the insulating layer-forming treatment solutions should preferably be water, though solvents such as alcohols and the like compatible with water may be added insofar as the phosphating agents, surfactants and the rust inhibitors can be dissolved.

When phosphoric acid, magnesium and boric acid are used in the phosphating treatment solution, the following compositions may be employed:

The amount of phosphoric acid to be used should preferably be in the range of one to 163 grams. If it is higher than 163 grams, the magnetic flux density is reduced, while if it is lower than one gram, the insulating properties are diminished. The amount of boric acid to be used should preferably be in the range of 0.05 to 0.4 gram based on one gram of phosphoric acid. Outside this range the stability of the insulating layers is deteriorated.

In order to form insulating layers uniformly all over the surfaces of iron particles, the wettability of the iron particles by the insulating layer-forming solutions should effectively be enhanced. For this reason it is preferred to add some surfactants. These surfactants include, for example, perfluoroalkyl surfactants, alkylbenzensulfonic acid surfactants, amphoteric surfactants, and polyether surfactants. The amount of them to be added should preferably be in the range of 0.01 to 1% by weight based on the insulating layer-forming solution. Less than 0.01% by weight leads to an insufficient reduction in surface tension to wet the surfaces of iron particles, while the use of higher than one % by weight does not give additional effects resulting in waste of the materials.

The perfluoroalkyl surfactants have higher wettability to the iron particles in the insulating layer-forming solutions than the other surfactants mentioned above. Therefore, when the perfluoroalkyl surfactants are used, good insulating layers can be formed by adding only the perfluoroalkyl surfactants to the phosphating solutions without a rust inhibitor.

The amount of a rust inhibitor to be used should preferably be in the range of 0.01 to 0.5 mol/$dm^3$. If it is lower than 0.01 mol/$dm^3$, prevention of the surfaces of metal from rusting becomes difficult. Even if it is higher than 0.5 mol/$dm^3$, no additional effect is realized making its addition uneconomical.

The amount of the insulating layer-forming treatment solution to be added should desirably be in the range of 25 to 300 milliliters per 1 kg of soft magnetic particles. If it is higher than 300 milliliters based on soft magnetic particles, the insulating coatings on the surfaces of soft magnetic particles become too thick, which allows the particles to rust easily, resulting in a, reduction in magnetic flux density of soft magnetic powder composite cores made with the particles. If it is lower than 25 milliliters, there may be caused disadvantages of poor insulating properties, an increase in the amount of rust to be generated in the regions unwetted with the treatment solution, an increase in eddy current loss and a reduction in magnetic flux density of the core.

The soft magnetic particles to be used include pure iron which is a soft magnetic material, and iron based alloy particles such as Fe-Si alloys, Fe-Al alloys, Permalloy, and Sendust. However, pure iron is preferred in that it has a high magnetic flux density, good formability and low cost.

The present invention is described in detail with reference to Examples.

Description of the Preferred Embodiments

EXAMPLE 1

20 grams of phosphoric acid, 4 grams of boric acid, and 4 grams of metal oxide such as MgO, ZnO, CdO, CaO, or BaO were dissolved in one liter of water. As surfactants, EF-104 (produced by Tochemi Products), EF-122 (produced by Tochemi Products), EF-132 (produced by Tochemi Products), Demole SS-L (produced by Kao), Anhitole 20BS (produced by Kao), Anhitole 20N (produced by Kao), Neoperex F-25 (produced by Kao), Gafac RE-610 (available from Toho Ragaku), or Megafac F-110 (available from Dainippon Ink Kagaku) were used.

As rust inhibitors, benzotriazole (BT), imidazole (IZ), benzoimidazole (BI), thiourea (TU), 2-mercaptobenzoimidazole (MI), octylamine (OA), triethanolamine (TA), o-toluidine (TL), indole (ID), and 2-methylpyrrole (MP) were used in proportions as shown in Table 1 to prepare insulating layer-forming solutions.

The insulating layer-forming solutions were added in an amount of 50 milliliters based on 1 kg of iron particles which had been prepared by atomizing into articles of 70 μm of mean particle size in diameter, mixed for 30 minutes with a V mixer, and dried for 60 minutes at 180° C. in a warm air-circulating thermostatic chamber to accomplish the treatment for insulating the surfaces of iron particles.

Moreover, the similar procedure was repeated to perform the insulating treatment of spheroid iron particles made of atomized iron powder of 100 μm of mean particle size in diameter.

Next, 2% by weight of a polyimide resin were added as a binder, and then 0.1% by weight of lithium stearate was added as a releasing agent. The resulting mixture was cast into a metal mold, pressed under a pressure of 500 MPa into a ring form, cured at 200° C. for 4 hours to produce a ring type soft magnetic powder composite core specimen having dimensions of 50 mm in outside diameter×30 mm in inside diameter×25 mm in thickness for measuring iron loss and a rod type soft magnetic powder composite core specimen having dimensions of 60 mm×10 mm×10 mm for measuring resistivity.

These specimens were determined for iron loss and resistivity which has a great influence on eddy current loss. The measurement of iron loss was performed at 15 kHz at 0.5 T. The results obtained are shown in Tables 1 and 2 for the atomized iron particles of 70 μm of mean particle size and those for the spheroid iron particles made of atomized iron powder having an average particle size of 100 μm are shown in Table 3.

As a result, it has been found that the atomized iron particles of 70 μm of mean particle size have a higher resistivity than that of the spheroid ion particles made of atomized iron powder particles having an average particle size of 100 μm, though the rust inhibitors have a great influence on the improvement in resistivity as well as on the reduction in iron loss for both iron particles.

TABLE 1

| Run No. | Phosphoric acid (g/l) | Boric acid (g/l) | Metal oxide (g/l) | Surfactant (Wt. %) | Rust inhibitor (mol/l) | Iron loss (W/kg) | Resistivity (Ωcm) |
|---|---|---|---|---|---|---|---|
| 1 | 20 | 4 | MgO (4) | SS-L (0.1) | BT (0.04) | 16 | 62 |
| 2 | 20. | 4 | MgO (4) | SS-L (1.0) | BT (0.04) | 16 | 420 |
| 3 | 20 | 4 | MgO (4) | RE-610 (0.1) | BT (0.04) | 16 | 87 |
| 4 | 20 | 4 | MgO (4) | RE-610 (1.0) | BT (0.04) | 16 | 530 |
| 5 | 20 | 4 | MgO (4) | F-110 (0.1) | BT (0.04) | 16 | 620 |
| 6 | 20 | 4 | MgO (4) | F-110 (1.0) | BT (0.04) | 16 | 1100 |
| 7 | 20 | 4 | MgO (4) | F-120 (0.1) | BT (0.04) | 16 | 300 |
| 8 | 20 | 4 | MgO (4) | F-120 (1.0) | BT (0.04) | 16 | 760 |
| 9 | 20 | 4 | MgO (4) | 20BS (0.1) | BT (0.04) | 16 | 320 |
| 10 | 20 | 4 | MgO (4) | 20BS (1.0) | BT (0.04) | 16 | 820 |
| 11 | 20 | 4 | MgO (4) | 20N (0.1) | BT (0.04) | 16 | 1400 |
| 12 | 20 | 4 | MgO (4) | 20N (1.0) | BT (0.04) | 16 | 2300 |
| 13 | 20 | 4 | MgO (4) | F-25 (0.1) | BT (0.04) | 16 | 96 |
| 14 | 20 | 4 | MgO (4) | F-25 (1.0) | BT (0.04) | 16 | 520 |
| 15 | 20 | 4 | MgO (4) | EF-122 (0.1) | BT (0.04) | 16 | 3200 |

TABLE 1-continued

| Run No. | Phosphoric acid (g/l) | Boric acid (g/l) | Metal oxide (g/l) | Surfactant (Wt. %) | Rust inhibitor (mol/l) | Iron loss (W/kg) | Resistivity (Ωcm) |
|---|---|---|---|---|---|---|---|
| 16 | 20 | 4 | MgO (4) | EF-122 (1.0) | BT (0.04) | 16 | 5200 |
| 17 | 20 | 4 | MgO (4) | EF-132 (0.01) | BT (0.04) | 16 | 56 |
| 18 | 20 | 4 | MgO (4) | EF-132 (0.1) | BT (0.04) | 16 | 720 |
| 19 | 20 | 4 | MgO (4) | EF-132 (1.0) | BT (0.04) | 16 | 2100 |
| 20 | 20 | 4 | MgO (4) | EF-104 (0.01) | BT (0.04) | 16 | 95 |
| 21 | 20 | 4 | MgO (4) | EF-104 (0.1) | BT (0.04) | 16 | 6100 |
| 22 | 20 | 4 | MgO (4) | EF-104 (1.0) | BT (0.04) | 16 | 12000 |
| 23 | 20 | — | MgO (4) | EF-104 (0.1) | BT (0.04) | 16 | 1200 |
| 24 | 20 | 4 | ZnO (4) | EF-104 (0.1) | BT (0.04) | 16 | 960 |
| 25 | 20 | 4 | CdO (4) | EF-104 (0.1) | BT (0.04) | 16 | 320 |

TABLE 2

| Run No. | Phosphoric acid (g/l) | Boric acid (g/l) | Metal oxide (g/l) | Surfactant (Wt. %) | Rust inhibitor (mol/l) | Iron loss (W/kg) | Resistivity (Ωcm) |
|---|---|---|---|---|---|---|---|
| 26 | 20 | 4 | CaO (4) | EF-104 (0.1) | BT (0.04) | 16 | 1500 |
| 27 | 20 | 4 | BaO (4) | EF-104 (0.1) | BT (0.04) | 16 | 120 |
| 28 | 20 | 4 | SrO (4) | EF-104 (0.1) | BT (0.04) | 16 | 510 |
| 29 | 20 | 4 | MgO (4) | EF-104 (0.1) | BT (0.01) | 16 | 70 |
| 30 | 20 | 4 | MgO (4) | EF-104 (0.1) | BT (0.5) | 16 | 11000 |
| 31 | 20 | 4 | MgO (4) | EF-104 (0.1) | IZ (0.01) | 16 | 63 |
| 32 | 20 | 4 | MgO (4) | EF-104 (0.1) | IZ (0.04) | 16 | 2100 |
| 33 | 20 | 4 | MgO (4) | EF-104 (0.1) | IZ (0.5) | 16 | 4200 |
| 34 | 20 | 4 | MgO (4) | EF-104 (0.1) | BI (0.01) | 16 | 80 |
| 35 | 20 | 4 | MgO (4) | EF-104 (0.1) | BI (0.04) | 16 | 3300 |
| 36 | 20 | 4 | MgO (4) | EF-104 (0.1) | BI (0.5) | 16 | 6200 |
| 37 | 20 | 4 | MgO (4) | EF-104 (0.1) | TU (0.5) | 16 | 120 |
| 38 | 20 | 4 | MgO (4) | EF-104 (0.1) | MI (0.01) | 16 | 51 |
| 39 | 20 | 4 | MgO (4) | EF-104 (0.1) | MI (0.04) | 16 | 1100 |
| 40 | 20 | 4 | MgO (4) | EF-104 (0.1) | OA (0.01) | 16 | 71 |
| 41 | 20 | 4 | MgO (4) | EF-104 (0.1) | OA (0.04) | 16 | 720 |
| 42 | 20 | 4 | MgO (4) | EF-104 (0.1) | OA (0.5) | 16 | 980 |
| 43 | 20 | 4 | MgO (4) | EF-104 (0.1) | TA (0.01) | 16 | 54 |
| 44 | 20 | 4 | MgO (4) | EF-104 (0.1) | TA (0.04) | 16 | 970 |
| 45 | 20 | 4 | MgO (4) | EF-104 (0.1) | TA (0.5) | 16 | 1100 |
| 46 | 20 | 4 | MgO (4) | EF-104 (0.1) | TL (0.04) | 16 | 50 |
| 47 | 20 | 4 | MgO (4) | EF-104 (0.1) | ID (0.01) | 16 | 58 |
| 48 | 20 | 4 | MgO (4) | EF-104 (0.1) | ID (0.04) | 16 | 560 |
| 49 | 20 | 4 | MgO (4) | EF-104 (0.1) | MP (0.01) | 16 | 76 |
| 50 | 20 | 4 | MgO (4) | EF-104 (0.1) | MP (0.04) | 16 | 990 |
| 51 | 20 | 4 | MgO (4) | EF-104 (0.1) | MP (0.5) | 16 | 3400 |

TABLE 3

| Run No. | Phosphoric acid (g/l) | Boric acid (g/l) | Metal oxide (g/l) | Surfactant (Wt. %) | Rust inhibitor (mol/l) | Iron loss (W/kg) | Resistivity (Ωcm) |
|---|---|---|---|---|---|---|---|
| 52 | 20 | 4 | MgO (4) | RE-610 (1.0) | BT (0.04) | 17 | 64 |
| 53 | 20 | 4 | MgO (4) | F-110 (0.1) | BT (0.04) | 17 | 59 |
| 54 | 20 | 4 | MgO (4) | F-110 (1.0) | BT (0.04) | 17 | 100 |
| 55 | 20 | 4 | MgO (4) | F-120 (1.0) | BT (o.04) | 17 | 79 |
| 56 | 20 | 4 | MgO (4) | 20BS (0.1) | BT (0.04) | 17 | 51 |
| 57 | 20 | 4 | MgO (4) | 20BS (1.0) | BT (0.04) | 17 | 100 |
| 58 | 20 | 4 | MgO (4) | 20N (0.1) | BT (0.04) | 17 | 160 |
| 59 | 20 | 4 | MgO (4) | 20N (1.0) | BT (0.04) | 17 | 200 |
| 60 | 20 | 4 | MgO (4) | F-25 (1.0) | BT (0.04) | 17 | 72 |
| 61 | 20 | 4 | MgO (4) | EF-122 (0.1) | BT (0.04) | 17 | 180 |
| 62 | 20 | 4 | MgO (4) | EF-122 (1.0) | BT (0.04) | 17 | 210 |
| 63 | 20 | 4 | MgO (4) | EF-132 (0.1) | BT (0.04) | 17 | 70 |
| 64 | 20 | 4 | MgO (4) | EF-132 (1.0) | BT (0.04) | 17 | 120 |
| 65 | 20 | 4 | MgO (4) | EF-104 (0.1) | BT (0.04) | 17 | 210 |
| 66 | 20 | 4 | MgO (4) | EF-104 (1.0) | BT (0.04) | 17 | 240 |
| 67 | 20 | — | MgO (4) | EF-104 (0.1) | BT (0.04) | 17 | 80 |
| 68 | 20 | 4 | ZnO (4) | EF-104 (0.1) | BT (0.04) | 17 | 100 |
| 69 | 20 | 4 | CaO (4) | EF-104 (0.1) | BT (0.04) | 17 | 120 |
| 70 | 20 | 4 | MgO (4) | EF-104 (0.1) | BT (0.5) | 17 | 200 |
| 71 | 20 | 4 | MgO (4) | EF-104 (0.1) | IZ (0.04) | 17 | 100 |

TABLE 3-continued

| Run No. | Phosphoric acid (g/l) | Boric acid (g/l) | Metal oxide (g/l) | Surfactant (Wt. %) | Rust inhibitor (mol/l) | Iron loss (W/kg) | Resistivity (Ωcm) |
|---|---|---|---|---|---|---|---|
| 72 | 20 | 4 | MgO (4) | EF-104 (0.1) | IZ (0.5) | 17 | 120 |
| 73 | 20 | 4 | MgO (4) | EF-104 (0.1) | BI (0.04) | 17 | 140 |
| 74 | 20 | 4 | MgO (4) | EF-104 (0.1) | BI (0.5) | 17 | 130 |
| 75 | 20 | 4 | MgO (4) | EF-104 (0.1) | MI (0.04) | 17 | 80 |
| 76 | 20 | 4 | MgO (4) | EF-104 (0.1) | OA (0.04) | 17 | 50 |
| 77 | 20 | 4 | MgO (4) | EF-104 (0.1) | OA (0.5) | 17 | 50 |
| 78 | 20 | 4 | MgO (4) | EF-104 (0.1) | TA (0.04) | 17 | 60 |
| 79 | 20 | 4 | MgO (4) | EF-104 (0.1) | MP (0.04) | 17 | 80 |
| 80 | 20 | 4 | MgO (4) | EF-104 (0.1) | MP (0.5) | 17 | 110 |

COMPARATIVE EXAMPLE 1

Under the same conditions as in Example 1, insulating layer-forming solutions containing 0.01 or 0% by weight of surfactant, 0.005 or 0 mol/liter of rust inhibitor were prepared. Specimens were prepared in the same procedure as in Example 1 and determined for resistivity. The results obtained are shown in Table 4 for the atomized iron particles of 70 μm of mean particle size, and those for the spheroid iron particles made of atomized iron powder having an average particle size of 100 μm are shown in Table 5.

It can be seen that when the content of surfactants is not higher than 0.01%, or the concentration of rust inhibitors is not higher than 0.005 mol/liter, the iron loss is higher and the resistivity is smaller as shown in Tables 4 and 5.

EXAMPLE 2

An insulating layer-forming solution having the same composition as Run No. 65 in Example 1 was added in a varying amount of 0 to 500 milliliters based on 1 kg of spheroid iron particle made of atomized iron particle having an average particle size of 100 μm, mixed for one hour with a V mixer, and dried for one hour at 180° C. in a warm air-circulating thermostatic chamber to accomplish the treatment for insulating the surfaces of iron particles.

The soft magnetic particles subjected to the insulating treatment were molded in the identical method to that in Example 1 to produce ring type specimens which were measured for iron loss and magnetic flux density. The results are shown in FIG. 1. It can be seen that an amount of the treatment solution to be added of 25 to 300 milliliters allows a high value of magnetic flux density to be kept without increasing iron loss.

TABLE 4

| Run No. | Phosphoric acid (g/l) | Boric acid (g/l) | Metal oxide (g/l) | Surfactant (Wt. %) | Rust inhibitor (mol/l) | Iron loss (W/kg) | Resistivity (Ωcm) |
|---|---|---|---|---|---|---|---|
| 81 | 20 | 4 | MgO (4) | F-120 (0.01) | BT (0.04) | 22 | 0.090 |
| 82 | 20 | 4 | MgO (4) | F-25 (0.01) | BT (0.04) | 23 | 0.085 |
| 83 | 20 | 4 | MgO (4) | EF-104 (0.1) | BT (0.005) | 19 | 0.18 |
| 84 | 20 | 4 | MgO (4) | EF-104 (0.1) | IZ (0.005) | 21 | 0.099 |
| 85 | 20 | 4 | MgO (4) | EF-104 (0.1) | BI (0.005) | 20 | 0.13 |
| 86 | 20 | 4 | MgO (4) | EF-104 (0.1) | TU (0.005) | 21 | 0.10 |
| 87 | 20 | 4 | MgO (4) | EF-104 (0.1) | MI (0.005) | 21 | 0.096 |
| 88 | 20 | 4 | MgO (4) | EF-104 (0.1) | OA (0.005) | 22 | 0.091 |
| 89 | 20 | 4 | MgO (4) | — | — | 70 | 0.005 |
| 90 | 20 | 4 | MgO (4) | EF-104 (0.1) | — | 19 | |
| 91 | 20 | 4 | MgO (4) | — | BT (0.04) | 33 | 0.050 |

TABLE 5

| Run No. | Phosphoric acid (g/l) | Boric acid (g/l) | Metal oxide (g/l) | Surfactant (Wt. %) | Rust inhibitor (mol/l) | Iron loss (W/kg) | Resistivity (Ωcm) |
|---|---|---|---|---|---|---|---|
| 92 | 20 | 4 | MgO (4) | EF-132 (0.01) | BT (0.04) | 30 | 0.055 |
| 93 | 20 | 4 | MgO (4) | EF-104 (0.01) | BT (0.04) | 28 | 0.06 |
| 94 | 20 | 4 | MgO (4) | EF-104 (0.1) | BT (0.005) | 20 | 0.11 |
| 95 | 20 | 4 | MgO (4) | EF-104 (0.1) | IZ (0.005) | 22 | 0.088 |
| 96 | 20 | 4 | MgO (4) | EF-104 (0.1) | BI (0.005) | 21 | 0.097 |
| 97 | 20 | 4 | MgO (4) | EF-104 (0.1) | TU (0.005) | 22 | 0.090 |
| 98 | 20 | 4 | MgO (4) | EF-104 (0.1) | MI (0.005) | 21 | 0.10 |
| 99 | 20 | 4 | MgO (4) | EF-104 (0.1) | OA (0.005) | 21 | 0.095 |
| 100 | 20 | 4 | MgO (4) | — | — | 65 | 0.005 |
| 101 | 20 | 4 | MgO (4) | EF-104 (0.1) | — | 20 | 1.0 |
| 102 | 20 | 4 | MgO (4) | — | BT (0.04) | 37 | 0.044 |

EXAMPLE 3

An insulating layer-forming solution having the same composition as Run No. 65 in Example 1 was added in an amount of 50 milliliters based on 1 kg of spheroid iron particle made of atomized iron particle having an average particle size of 100 μm, mixed for one hour with a V mixer, and dried for one hour at 180° C. in a warm air-circulating thermostatic chamber to accomplish the treatment for insulating the surfaces of iron particles.

Figure 2:
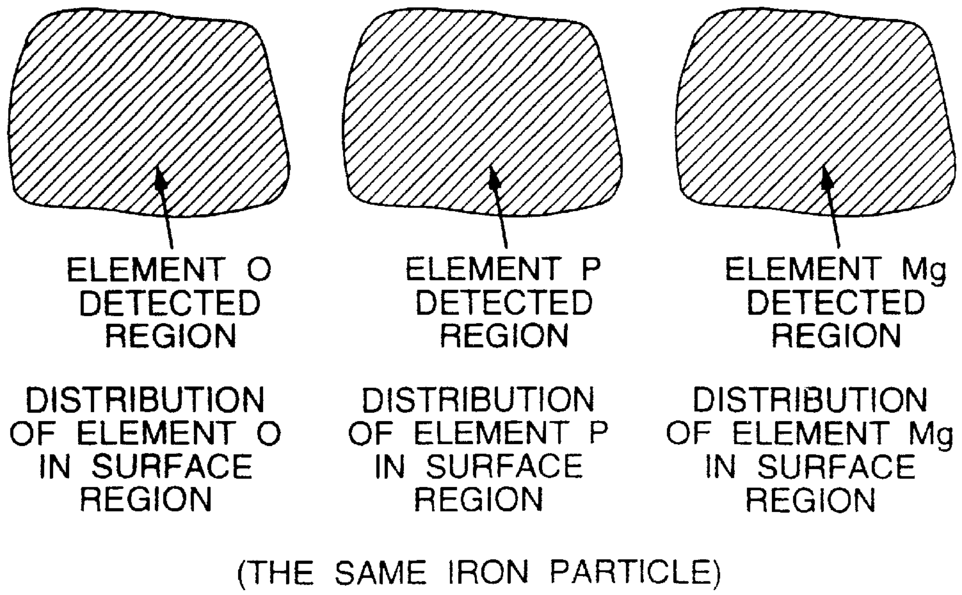
FIG. 2 is a schematic view of the distribution of each element such as O, P and Mg according to the Auger spectrum taken on the surfaces of iron particles after the insulating layers were formed.
Figure 3:
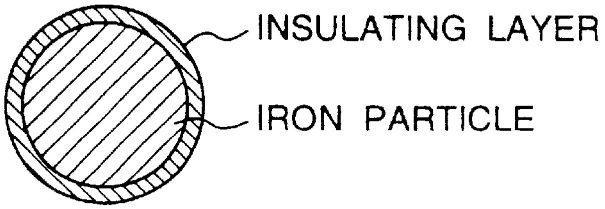
FIG. 3 is a schematic sectional view of the iron particles after the insulating layers were formed.

The surfaces were examined for the distribution of each element such as O, P and Mg by Auger spectrum. The results are schematically shown in FIG. 2. It can be seen that each element of O, P and Mg was uniformly distributed over the surfaces of iron particles. From this fact, the iron particles after being subjected to the treatment for insulating the iron particles with the insulating layer-forming solution having the same composition as in Run No. 65 had the uniform structure as shown in FIG. 3.

COMPARATIVE EXAMPLE 2

An insulating layer-forming solution having the same composition as the Run No. 100 in Comparative Example 1 was added in an amount of 50 milliliters based on 1 kg of spheroid iron particle made of atomized iron particle having an average particle size of 100 μm, mixed for one hour with a V mixer, and dried for one hour at 180° C. in a warm air-circulating thermostatic chamber to accomplish the treatment for insulating the surfaces of iron particles.

Figure 4:
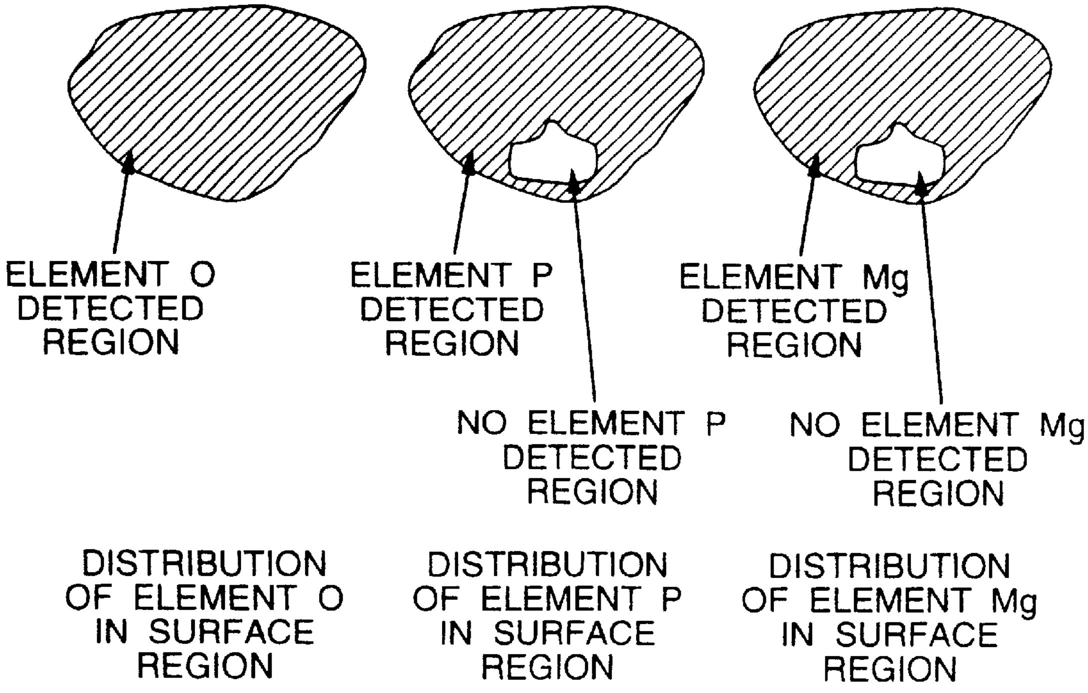
FIG. 4 is a schematic view of the distribution of each element such as O, P and Mg according to the Auger spectrum taken on the surfaces of prior art iron particles after being subjected to the conventional phosphating treatment.

The surfaces were examined for the distribution of each element of O, P and Mg by Auger spectrum. The results are schematically shown in FIG. 4. It can be seen that only an element C was uniformly distributed over the surfaces of iron particles, but that other elements P and Mg were not, and that $Mg_3(PO_4)_2$ and $FePO_4$ as well as iron oxide were formed on the surfaces of iron particles. The iron oxide may be expected to be $Fe_3O_4$ because of the darkened surfaces.

COMPARATIVE EXAMPLE 3

A rust inhibitor, benzotriazole (BT), benzoimidazole (IBI), 2-mercaptobenzoimidazole (MI), or triethanolamine (TA), was dissolved in acetone to prepare a 20% solution.

Atomized iron particles of 70 μm of mean particle size were immersed in the acetone solution containing the iron inhibitor as described above for one minute, filtered, and then dried at a temperature of 50° C. for 30 minutes.

The insulating layer-forming solution having the same composition as in the Run No. 21 in Example 1 as above was added in an amount of 50 milliliters based on 1 kg of the iron particles which had been treated for rust inhibition, mixed for 30 minutes with a V mixer, and dried for 60 minutes at 180° C. in a warm air-circulating thermostatic chamber to accomplish the treatment for insulating the surfaces of iron particles.

Next, 2% by weight of a polyimide resin were added as a binder and 0.1% by weight of lithium stearate was added as a releasing agent. The whole was mixed and cast into a metal mold, pressed under a pressure of 500 MPa, cured at 200° C. for 4 hours to produce a ring type soft magnetic powder composite core specimen having dimensions of 50 mm in outside diameter×30 mm inside diameter×25 mm in thickness for measuring iron loss, and a rod type soft magnetic powder composite core specimen having dimensions of 60 mm×10 mm×10 mm for measuring resistivity.

These specimens were determined for iron loss and resistivity in the same procedures as in Example 1. The results obtained are shown in Table 6. As compared to the values as shown in the above Tables 1and 2, the resistivity was lower and the iron loss was higher. This is because insulating layers could not uniformly be formed.

TABLE 6

| Run No. | Rust inhibitor | Iron loss (W/kg) | Resistivity (Ω cm) |
|---|---|---|---|
| 103 | Benzotriazole | 20 | 0.11 |
| 104 | Benzoimidazole | 22 | 0.089 |
| 105 | 2-mercapto benzoimidazole | 30 | 0.054 |
| 106 | Triethanolamine | 19 | 0.17 |

EXAMPLE 4

Figure 5:
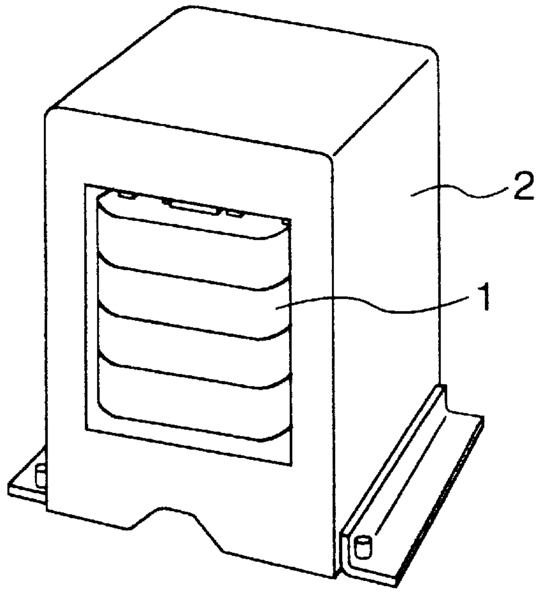
FIG. 5 shows an arrangement of a reactor using a pressed magnetic core.

FIG. 5 shows a reactor for turn-on stress relaxation composed of a soft magnetic powder composite core 1 and a coil 2 according to the present invention.

When used in the reactor for high frequency turn-on stress relaxation, it has been found that the use of the conventional magnetic core as soft magnetic powder composite core 1 causes the temperature of 6 the iron core to rise up to 130° C. due to iron loss, while the use of the magnetic core having a low iron loss according to the present invention as the core 1 resulted in a temperature of the iron core of 110° C.

EXAMPLE 5

Figure 6:
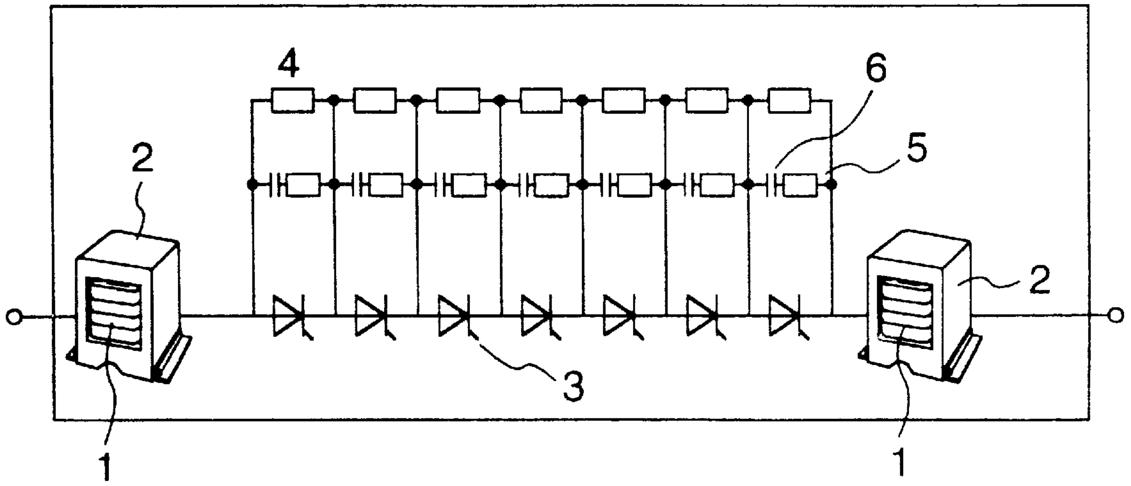
FIG. 6 shows an arrangement of a thyristor valve using pressed magnetic cores.

FIG. 6 illustrates an arrangement of an anode reactor which was assembled with a soft magnetic powder composite core 1 made of the soft magnetic particles treated with an insulating layer-forming solution according to the present invention and an organic binder, and with a coil 2, and a thyristor valve composed of a thyristor 3, voltage divider resistance 5, Snubber resistance, and Snubber capacitor 6.

By incorporating the anode reactor with the soft magnetic powder composite core of the present invention, the whole apparatus can be miniaturized.

The soft magnetic particles having insulating layers formed on the surfaces by treatment with the insulating layer-forming solution containing a phosphating solution and a rust inhibitor according to the present invention allow the provision of a soft magnetic powder composite core having a high density and a high resistivity and hence the easy production of a magnetic core having a high magnetic permeability and low iron loss.

What is claimed is:

1. A magnetic powder used for a magnetic core comprising:

iron particles, and an electric insulating layer on the surface of each iron particle, wherein said electric insulating layer is formed by mixing said iron particles with an insulating layer-forming solution which comprises a phosphating solution and a rust inhibitor, and drying the iron particles at a predetermined temperature, and wherein said rust inhibitor is an organic compound containing at least one of nitrogen and sulfur each with a lone electron pair, and the concentration of said rust inhibitor is 0.01 to 0.5 mol/dm3.

2. The magnetic powder according to claim 1, wherein said phosphating solution contains phosphoric acid and at least one of Mg, Zn, Mn, Cd, and Ca.

3. The magnetic powder according to claim 1, wherein said rust inhibitor is a benzotriazole derivative represented by the following formula (1):

(1)

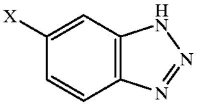

where X is H, $CH_3$, $C_2H_5$, $C_3H_7$, $NH_2$, OH, or COOH.

4. The magnetic powder according to claim 1, wherein said insulating layer-forming solution is incorporated at a rate of 25 to 300 milliliters per 1 kg of said iron particles.

5. A magnetic core formed by mixing the magnetic powder claimed in claim 1, casting said magnetic powder into a metal mold, and then pressing said magnetic powder into a magnetic core.

6. The magnetic core according to claim 5, wherein said magnetic core has a density of 6.6 to 7.0 grams/cm$^3$ and a resistivity of 20 to 100,000 Ωcm.

7. The magnetic core according to claim 5, wherein said magnetic core is further formed by subjecting the pressed magnetic powder to a heat-treatment.

8. A reactor for turn-on stress relaxation, comprising:

the magnetic core claimed in claim 5, and a coil, wherein said magnetic core has a density of 6.6 to 7.0 grams/cm$^3$ and a resistivity of 20 to 100,000 Ωcm.

9. The reactor for turn-on stress relaxation according to claim 8, wherein said magnetic core has a resistivity of 20 to 100,000 Ωcm at 0 to 200° C.

10. A thyristor valve, comprising:

an anode reactor assembled with the magnetic core claimed in claim 5, a coil, a thyristor, a voltage divider resistance, and a snubber resistance, wherein said magnetic core has a density of 6.6 to 7.0 grams/cm$^3$ and a resistivity of 20 to 100,000 Ωcm.

11. The thyristor valve according to claim 10, wherein said magnetic core has a resistivity of 20 to 100,000 Ωcm at 0 to 200° C.

12. A high frequency power transformer using the magnetic core claimed in claim 5 as a part of an electric circuit, wherein said magnetic core has a resistivity of 20 to 100,000 Ωcm at 0 to 200° C.

13. A commutation reactor using the magnetic core claimed in claim 5 as a part of an electric circuit, wherein said magnetic core has resistivity of 20 to 100,000 Ωcm at 0 to 200° C.

14. An energy accumulation reactor using the magnetic core claimed in claim 5 as a part of an electric circuit, wherein said magnetic core has a resistivity of 20 to 100,000 Ωcm at 0 to 200° C.

15. A matching transformer using the magnetic core claimed in claim 5 as a part of an electric circuit, wherein said magnetic core has a resistivity of 20 to 100,000 Ωcm at 0 to 200° C.

16. A noise filter using the magnetic core claimed in claim 5 as a part of an electric circuit, wherein said magnetic core has a resistivity of 20 to 100,000 Ωcm at 0 to 200° C.

17. A choke coil using the magnetic core claimed in claim 5 as a part of an electric circuit, wherein said magnetic core has a resistivity of 20 to 100,000 Ωcm at 0 to 200° C.

18. The magnetic powder according to claim 1, wherein said solution includes a surfactant, and the concentration of said surfactant is 0.01 to 1% by weight.

19. The magnetic powder according to claim 18, wherein said surfactant comprises a perfluoroalkyl group having 3–15 carbon atoms in the main chain and an anionic or cationic functional group.

20. A process for making a magnetic core, comprising the steps of:

mixing the magnetic powder claimed in claim 1 with a binder resin;

casting said magnetic powder into a metal mold; and pressing said magnetic powder into a magnetic core.

21. The process for making a magnetic core according to claim 20, wherein said magnetic powder is pressed into a magnetic core which has a density of 6.6 to 7.0 grams/cm$^3$ and a resistivity of 20 to 100,000 Ωcm.

22. The process for making a magnetic core according to claim 20, further comprising a step of subjecting the pressed magnetic powder to a heat-treatment.

23. A process for making magnetic powder used for a magnetic core, comprising the steps of:

mixing iron particles with an insulating layer-forming solution which comprises a phosphating solution and a rust inhibitor; and drying said iron particles at a predetermined temperature, wherein said rust inhibitor is an organic compound containing at least one of nitrogen and sulfur each with a lone electron pair, and the concentration of said rust inhibitor is 0.01 to 0.5 mol/dm$^3$.

24. The process for making magnetic powder according to claim 23, wherein said phosphating solution contains phosphoric acid and at least one of Mg, In, Mn, Cd, and Ca.

25. The process for making magnetic powder according to claim 23, wherein said rust inhibitor is a benzotriazole derivative represented by the formula (1):

(1)

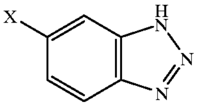

where X is H, $CH_3$, $C_2H_5$, $C_3H_7$, $NH_2$, OH, or COOH.

26. The process for making magnetic powder according to claim 23, wherein said insulating layer-forming solution is incorporated at a rate of 25 to 300 milliliters per 1 kg of said iron particles.

27. The process for making magnetic powder according to claim 23, wherein said insulating layer-forming solution includes a surfactant, and the concentration of said surfactant is 0.01 to 1% by weight.

28. The process for making magnetic powder according to claim 27, wherein said surfactant comprises a perfluoroalkyl group having 3–15 carbon atoms in the main chain and an anionic or a cationic functional group.

* * * * *